INVENTOR.
KLAUS LAGEMANN
BY
[signature]
AGENT

July 29, 1969 K. LAGEMANN 3,458,825

BISTABLE TRIGGER CIRCUIT COMPRISING TWO RELATIVELY COMPLEMENTARY OUTPUTS AND TWO INPUTS AND A CLOCK PULSE INPUT

Filed Feb. 10, 1967 8 Sheets-Sheet 2

INVENTOR.
KLAUS LAGEMANN

BY

[signature]

AGENT

INVENTOR.
KLAUS LAGEMANN

BY [signature]

AGENT

INVENTOR.
KLAUS LAGEMANN
BY
Frank R. Trifari
AGENT

July 29, 1969 K. LAGEMANN 3,458,825

BISTABLE TRIGGER CIRCUIT COMPRISING TWO RELATIVELY COMPLEMENTARY OUTPUTS AND TWO INPUTS AND A CLOCK PULSE INPUT

Filed Feb. 10, 1967 8 Sheets-Sheet 5

INVENTOR.
KLAUS LAGEMANN

BY
Frank R. Trifari
AGENT

July 29, 1969 K. LAGEMANN 3,458,825

BISTABLE TRIGGER CIRCUIT COMPRISING TWO RELATIVELY COMPLEMENTARY OUTPUTS AND TWO INPUTS AND A CLOCK PULSE INPUT

Filed Feb. 10, 1967 8 Sheets-Sheet 6

INVENTOR.
KLAUS LAGEMANN

BY

AGENT

July 29, 1969 K. LAGEMANN 3,458,825

BISTABLE TRIGGER CIRCUIT COMPRISING TWO RELATIVELY COMPLEMENTARY OUTPUTS AND TWO INPUTS AND A CLOCK PULSE INPUT

Filed Feb. 10, 1967 8 Sheets-Sheet 7

INVENTOR.
KLAUS LAGEMANN

BY

Frank R Trifari

AGENT

INVENTOR.
KLAUS LAGEMANN
BY
[signature]
AGENT 3,458,825

BISTABLE TRIGGER CIRCUIT COMPRISING TWO RELATIVELY COMPLEMENTARY OUTPUTS AND TWO INPUTS AND A CLOCK PULSE INPUT

Klaus Lagemann, Garstedt, Germany, assignor, by mesne assignments, to U.S. Philips Corporation, New York, N.Y., a corporation of Delaware Filed Feb. 10, 1967, Ser. No. 615,092
Claims priority, application Germany, Feb. 17, 1966, P 38,801
Int. Cl. H03k 3/12
U.S. Cl. 328—206 12 Claims

ABSTRACT OF THE DISCLOSURE

A bistable trigger circuit having two relatively complementary outputs Q and $\overline{Q}$, two inputs V and D and a clock pulse is constituted by an arrangement of gating circuits which provides, when a binary "1" has been applied to the input V, an output Q indicating that either a binary "1" or "0" has been applied to the input D, or, when a binary "0" is applied to the input V, an output Q which will not change state regardless of the signal present at input D.

Figure 1A:
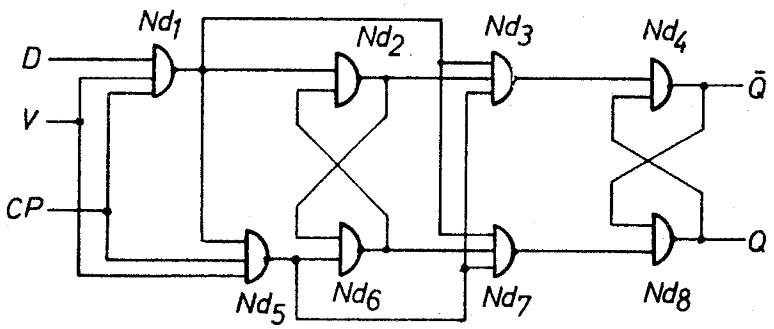

In the digital data processing technology it is known that complete subassembly systems are employed to an ever increasing extent. It has become common practice to define the separate subassemblies not by the electrical magnitudes but rather by information about their logical behaviour. Particularly in the area of counters and shift registers it has become common practice to distinguish the bistable trigger circuits on the basis of the sequential logic, for example the so-called D-flip-flops, T-flip-flops, RS-flip-flops and JK-flip-flops. (See M. Phister: Logical Design in Digital Computers, pages 121–132.)

All these bistable elements are similar in that they take up directly or in coded form the information at the logical inputs I at the reception of a clock pulse and transmit it to the output Q. The various types are all designed on the basis of the requirements of the synchronous switching circuit technique, in which in practice normally all clock pulse inputs are excited from a common source.

In the simplest type, the so-called d-flip-flop (delay flip-flop an information applied to the input $I \triangleq D$ is conducted on directly by the clock pulse to the output. Such a bistable trigger forms the fundamental assembly for shift registers.

The next simplest form is the T-flip-flop (trigger flip-flop). If an information is present at the input $I \triangleq T$, the bistable element changes over to the opposite state at the arrival of the next-following clock pulse. Otherwise it remains in the actual state. Such a subassembly allows a synchronous binary reduction.

More complicated bistable trigger circuits unite in different ways the properties of the D-flip-flop and of the T-flip-flop. A definitely imperfect solution gives the RS-flip-flop. This element comprises two logical inputs I. Since it is not allowed to occupy the two inputs simultaneously by the information "1", it is not possible to carry into effect the essential property of the T-flip-flop that is to say the change-over to the opposite state.

This drawback is avoided by the JK-flip-flop. It unites all possibilities of the D- and T-flip-flop and as a universal element it is definitely significant for subassembly systems. It is capable of carrying out the two fundamental operations in one and the same circuitry side by side so that it is very adaptable and contributes considerably to the reduction of the number of additional gates. Moreover, all problems of the a-synchronous technique, particularly those of the known a-synchronous counters can be solved by it.

However, in spite of the advantages of the JK-flip-flop described above, it does not yet constitute the optimum bistable element. Leaving first out of consideration the question of the internal construction of the various types of bistable triggers, the criterion left for judging the quality is in the first place the required minimum for carrying certain uses into effect. Additional requirements may, for example, be formed by the number of logical gates, for example, for a counter. However, the requirement may also relate simply to a complicated wiring. A direct disadvantage of the JK-flip-flop is, for example, that as a D-flip-flop for example in shift registers it always requires its two inputs J and K to be excited complementarily, although from the point of view of the information to be transmitted, properly speaking, a double excitation is not required.

According to these considerations a new trigger circuit should be characterized in that, for example, in the counter circuits fewer additional gates are required and, in the shift register circuits the complementary double excitation is dispensed with and, of course, the internal structure is note more complicated than that of the known JK-flip-flop.

The invention relates to a bistable trigger circuit having two relatively complimentary outputs and two inputs and a clock pulse input and is characterized in that a logical connection is provided between the inputs and the outputs so that, when a signal "1" is applied to the input V the output Q will always indicate subsequent to the arrival of a clock pulse, that signal "0" or "1" which has been applied to the input D prior to the arrival of the clock pulse and in that, when the signal (O) is applied to the input V, the output Q does not change its state at the arrival of a clock pulse independently of the signal present at the input D.

In this way a bistable element is obtained which, when used in shift register and counter circuitry, economizes connecting gates, reduces the wiring arrangement and contributes to the reduction of the transit times.

In accordance with the designations of the two inputs the new trigger circuit is termed a DV-flip-flop.

The drawings show embodiments and uses.

Figure 1B:
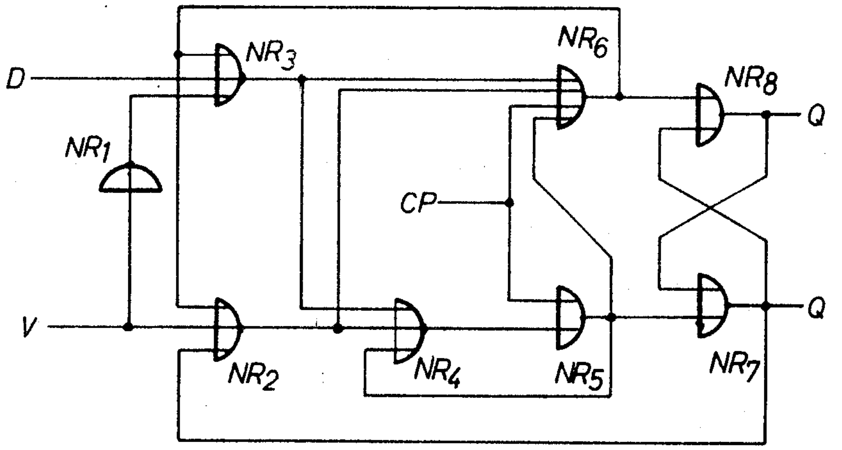
Figure 2:
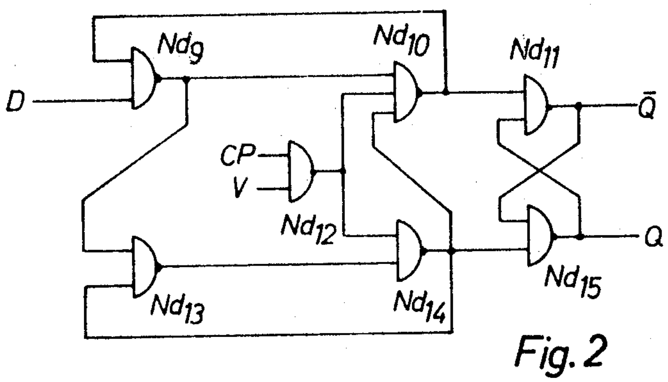
Figure 3A:
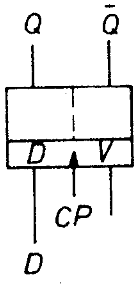
Figure 3B:
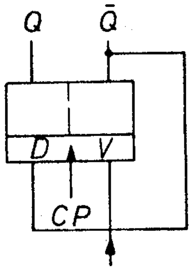
Figure 3C:
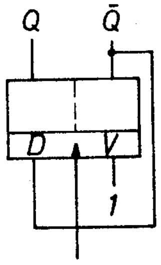
Figure 4A:
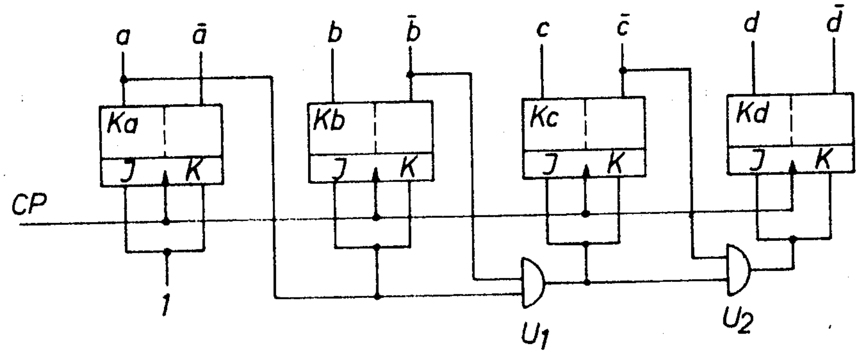
Figure 4B:
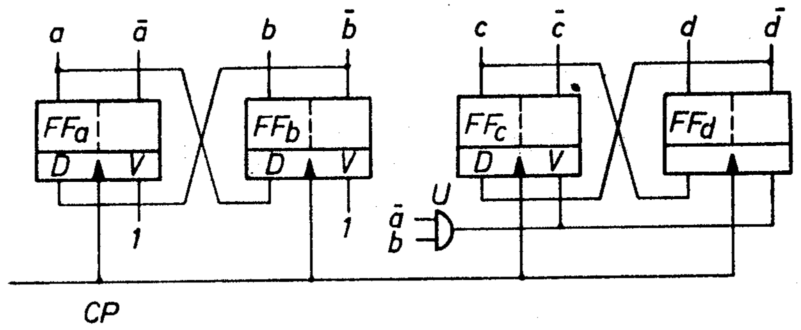
Figure 5A:
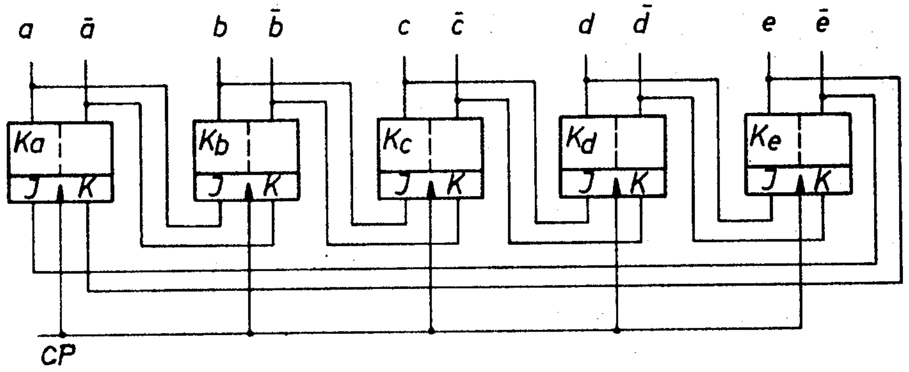
Figure 5B:
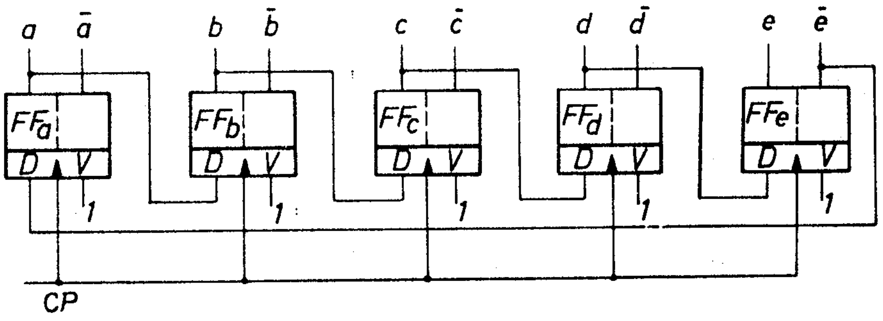
Figure 6A:
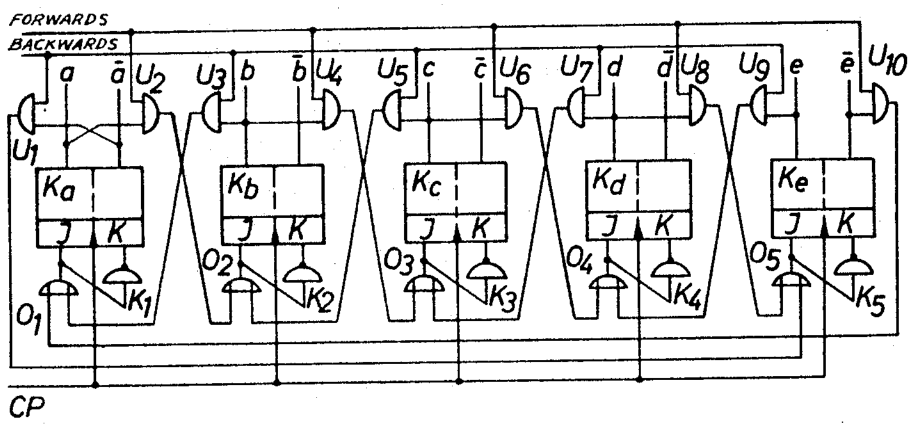
Figure 6B:
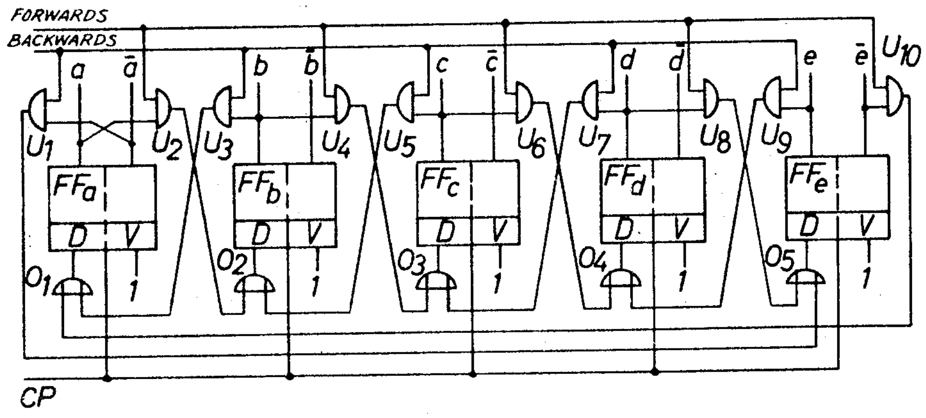
Figure 7:
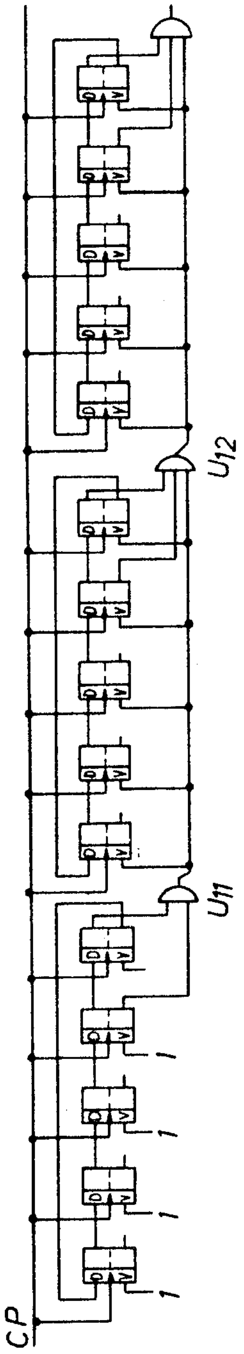
Figure 8:
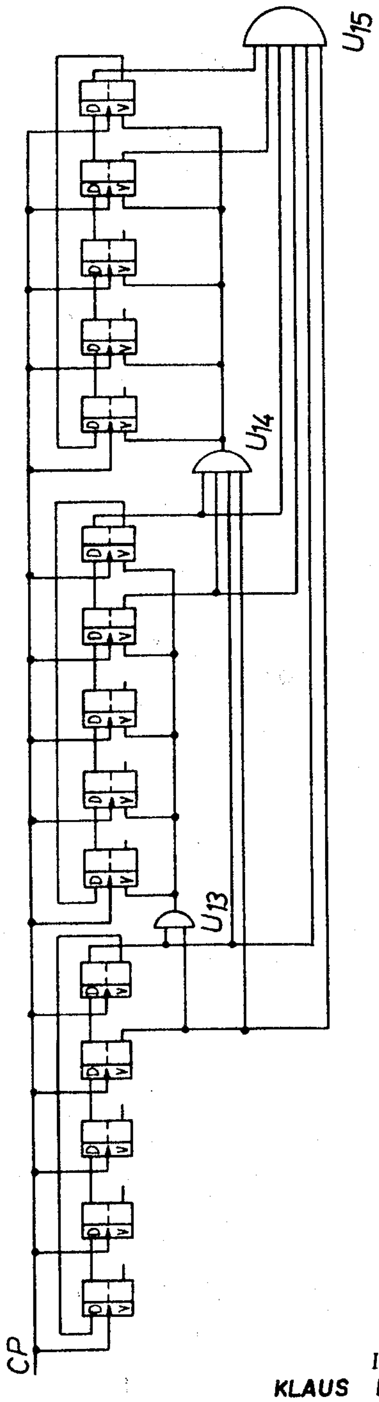
Figure 9A:
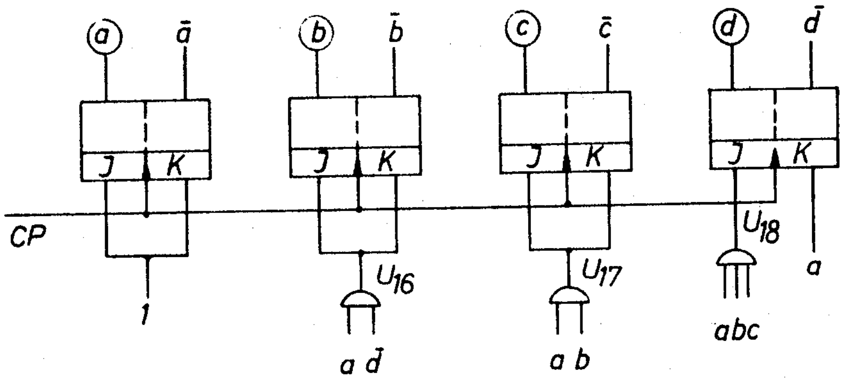
Figure 9B:
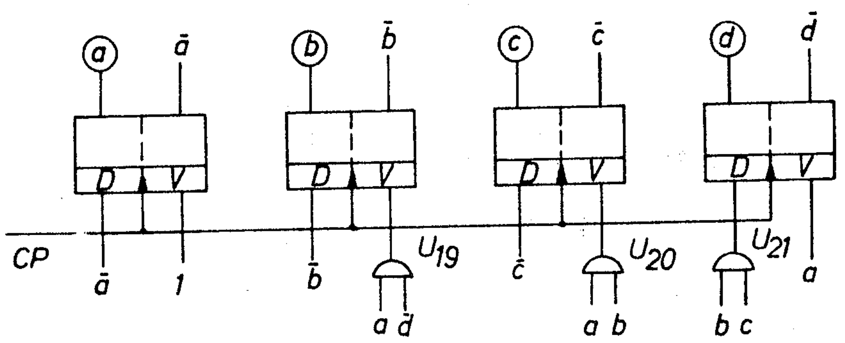
Figure 10A:
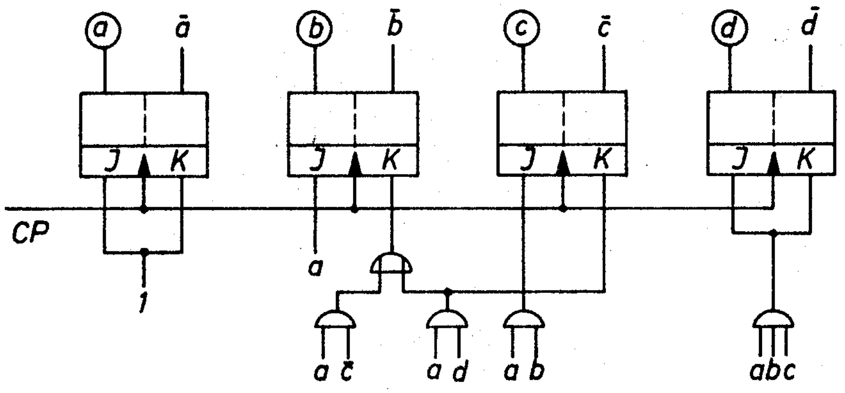
Figure 10B:
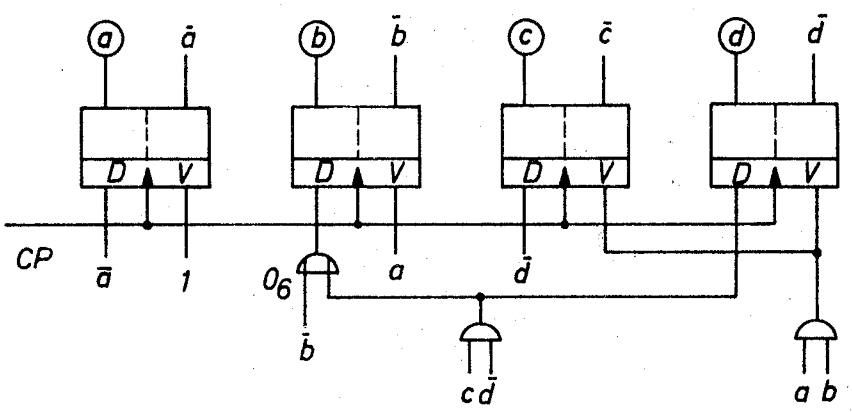
Figure 11A:
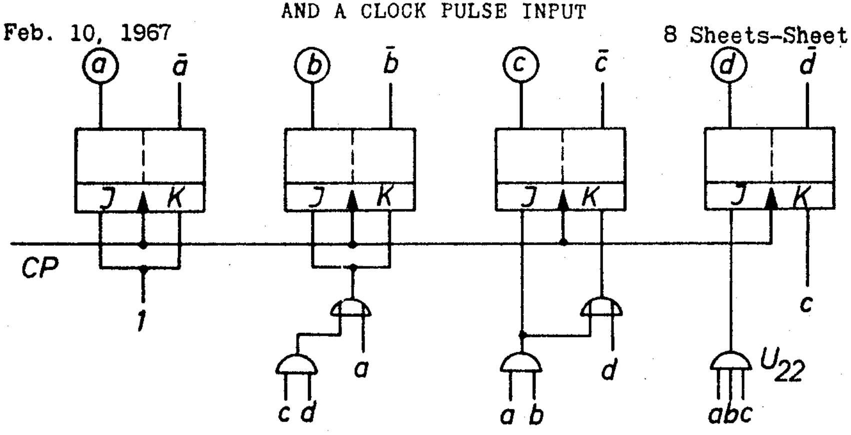
Figure 11B:
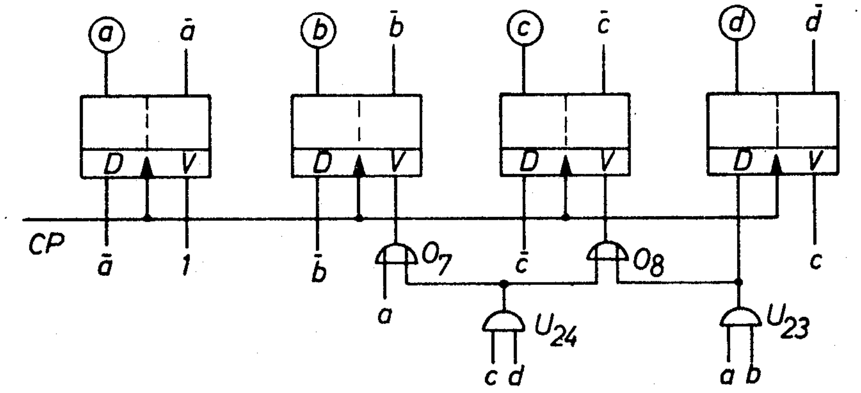
Figure 12:
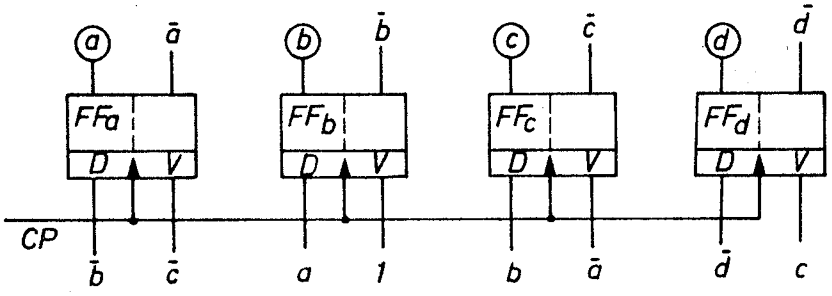

Herein:

FIG. 1*a* shows an embodiment having eight NAND-gates,

FIG. 1*b* an embodiment having eight NOR-gates,

FIG. 2 a further embodiment of the invention having seven NAND-gates,

FIG. 3*a* the trigger circuit in the form of a D-flip-flop,

FIG. 3*b* the trigger circuit as a T-flip-flop,

FIG. 3*c* the trigger circuit as an a-synchronous reducer,

FIG. 4*a* the simplest synchronous mod-16-counter of JK-flip-flops,

FIG. 4*b* the simplest synchronous mod-16-counter of DV-flip-flops,

FIG. 5*a* a shift register counter of JK-flip-flops,

FIG. 5*b* a shift register counter of DV-flip-flops,

FIG. 6*a* a shift register counter of JK-flip-flops for two directions of counting, FIG. 6*b* a shift register counter of DV-flip-flops for two senses of counting, FIG. 7 a synchronous mod-1000 counter with series connection for the transmission from DV-flip-flops, FIG. 8 a synchronous mod-1000 counter with parallel combination for the transmission of DV-flip-flops, FIG. 9*a* a synchronous mod-10 counter in 8.4.2.1 code of JK-flip-flops, FIG. 9*b* a synchronous mod-10 counter with 8.4.2.1 code of DV-flip-flops, FIG. 10*a* a synchronous mod-10 counter in the unsymmetrical 2-4-2-1 code of JK-flip-flops, FIG. 10*b* a synchronous mod-10 counter in an unsymmetrical 2-4-2-1 code of DV-flip-flops, FIG. 11*a* a synchronous mod-10 counter in the 3-excess code of JK-flip-flops, FIG. 11*b* a synchronous mod-10 counter in the 3-excess code of DV-flip-flops, FIG. 12 a synchronous mod-10 counter without gates.

The JK-flip-flop is usually composed of nine gates. The new DV-flip-flop comprises only eight gates $Nd_1$ . . . $Nd_8$ and $NR_1$ . . . $NR_8$ (FIGS. 1*a* and 1*b*) or seven gates $Nd_9$ . . . $Nd_{15}$ (FIG. 2). The logical inputs are designated by D and V. CP designates the clock pulse input and Q,$\bar{Q}$ are the relatively complementary outputs. Static setting and resetting inputs are not shown, since they are not essential for the idea of the invention and may be provided in known manner.

The arrangement shown in FIG. 1*a* operates as follows: The bistable trigger circuit comprises eight NAND-gates $Nd_1$ . . . $Nd_8$. A NAND-gate has at its output the value "0" only when all inputs receive the value "1." If one or more inputs have the value "0," the output has the value "1."

Basically different are two time periods: $t_0$ will designate the period of time in which the clock pulse input CP receives the value "0." Accordingly the period of time in which the value "1" is present at the input CP is designated by $t_1$.

During the time $t_0$ the output of the gates $Nd_1$ and $Nd_5$ have necessarily the value "1" owing to the clock pulse input and arbitrary values can be preadjusted from the inputs D and V. The behaviour of the flip-flop at the change-over from $t_0$ to $t_1$ depends only upon the preadjusted values at the inputs D and V.

First case: V="1" and D="1"

At the change-over from $t_0$ to $t_1$ (CP changes over from "0" to "1") the outputs of the NAND-gates adjust themselves in the following order of succession to given values: $Nd_1$="0," $Nd_5$="1," $Nd_2$="1," $Nd_6$="0," $Nd_3$="1," $Nd_7$="1." The actual states of the gates $Nd_4$ and $Nd_8$ are not affected. At the next change-over from $t_1$ to $t_0$ (CP changes over from "1" to "0") the following states of the gates are obtain: $Nd_1$="1," $Nd_5$="1," $Nd_2$="1," $Nd_6$="0," $Nd_7$="1," $Nd_3$="0," $Nd_4$="1," $Nd_8$="0." Then the output Q has the signal "1."

Second case: V="1" and D="0"

At the change-over from $t_0$ to $t_1$ the following gate positions: $Nd_1$="1," $Nd_5$="0," $Nd_6$="1," $Nd_2$="0," $Nd_3$="1," $Nd_7$="1." The gates $Nd_4$ and $Nd_8$ maintain their actual positions. At the next following change-over from $t_1$ to $t_0$ the following gate positions are obtained: $Nd_1$="1," $Nd_5$="1," $Nd_6$="1," $Nd_2$="0," $Nd_3$="1," $Nd_7$="0," $Nd_8$="1," $Nd_4$="0." Then the signal Q has the signal "0."

Third case: V="0" and D=arbitrary value "0" or "1"

At the change-over from $t_0$ to $t_1$ the outputs of the gates $Nd_1$ and $Nd_2$ of the input V are held at the value "1." No gates are changed over, even not at the change-over from $t_1$ to $t_0$.

To the arrangements shown in FIG. 1*b* the following applies: The bistable trigger circuit comprises eight NOR-gates $NR_1$ . . . $NR_8$. A NOR-gate has at its output the value "1" only when all the inputs receive the value "0." If at one or more of the inputs the value "1" is received, the output has the value "0."

The references $t_0$ and $t_1$ again relate to the periods of time in which the clock impulse input CP receives the value "0" or "1."

Changes of the inputs D and V are allowed during $t_0$ and $t_1$ but they are not allowed at the change-over from $t_1$ to $t_0$. The outputs of the bistable trigger circuits can change over only during the transition from $t_1$ to $t_0$ in a manner determined by the values at the inputs D and V immediately prior to the change-over.

First case: D="1," V="1"

During the period of time $t_1$ the following gate positions are obtained: $NR_1$="0," $NR_2$="0," $NR_3$="0," $NR_5$="0," $NR_6$="0," $NR_4$="1." The gates $NR_7$ and $NR_8$ have determined values "0" or "1," which emanate from the preceding clock pulse cycle. At the change-over from $t_1$ to $t_0$, the output of the gate $NR_6$ provides the value "1," so that the gate $NR_8$ has the value "0" and the gate $NR_7$ has the value "1." The output Q provides the signal "1." This state is maintained until the next change-over from $t_1$ to $t_0$. Up to this instant random variations at the inputs D and V do not affect the gates $NR_7$ and $NR_8$.

Second case: D="0," V="1"

During the time $t_1$ the following gate positions are obtained: $NR_5$="0," $NR_6$="0," $NR_1$="0," $NR_2$="0," $NR_3$="1," $NR_4$="0." The gates $NR_7$ and $NR_8$ maintain the values from the preceding clock pulse cycle. At the change-over from $t_1$ to $t_0$ the output of the gate $NR_5$ receives the value "1," so that the gate $NR_7$ has the value "0" and the gate $NR_8$ has the value "1." Thus the output Q has the signal "0" until the next change-over from $t_1$ to $t_0$.

Third case: V="0," D=arbitrary

During the time $t_1$ the following gate positions are found: $NR_5$="0," $NR_6$="0," $NR_1$="1," $NR_3$="0." Two subsidiary cases may be distinguished:

(a) The gate $NR_7$ still has the value "0" from the preceding clock pulse cycle (Q="0"). Then $NR_2$ assumes the value "1" and $NR_4$ the value "0." At the change-over from $t_1$ to $t_0$ the gate $NR_5$ comes into the state "1." The states of all further gates remain unchanged, and hence also that of the gate $NR_7$. The output Q thus maintains the value "0."

(b) The gate $NR_7$ still has the value "1" from the preceding clock pulse cycle (Q="1"). Then $NR_2$ has the value "0" and $NR_4$ the value "1." At the change-over from $t_1$ to $t_0$ the gate $NR_6$ comes in to the state "1." The positions of all further gates remain unchanged and hence also that of the gate $NR_7$. The output Q maintains the value "1."

Accordinngly it applies to the arrangement of FIG. 2 that: the bistable trigger circuit comprises seven NAND-gates; again the references $t_0$ (CP="0") and $t_1$ (CP="1") are used.

First case: V="1," D="1"

During the time $t_1$ the following gate positions are found: $Nd_{12}$="0," $Nd_{10}$="1," $Nd_{14}$="1," $Nd_9$="0," $Nd_{13}$="1." The state of the gates $Nd_{11}$ and $Nd_{15}$ is due to the preceding clock pulse cycle. At the change-over from $t_1$ to $t_0$ the gate $Nd_{12}$ changes over to the value "1" and hence the gate $Nd_{14}$ to the value "0." The gate $Nd_{15}$ is changed over to the value "1" and the gate $Nd_{11}$ to the value "0." The output Q then assumes the value "1," which is maintained until the next transition from $t_1$ to $t_0$. The values of the input D may be varied during $t_0$ and $t_1$, but the values of the input V may be varied only during $t_0$ without involving an undesirable change-over of the output.

Second case: V="1," D="0"

During the time $t_1$ the following gate positions are found: $Nd_{12}$="0," $Nd_{10}$="1," $Nd_{14}$="1," $Nd_9$="1," $Nd_{13}$="0." The gates $Nd_{11}$ and $Nd_{15}$ still have the values from the preceding clock pulse cycle. At the transition from $t_1$ to $t_0$ the gate $Nd_{12}$ changes over to the value "1" and the gate $Nd_{10}$ subsequently to the value "0." As a result $Nd_{11}$ has the value "1" and $Nd_{15}$ the value "0." The output Q then has the signal "0," which is maintained until the next transition from $t_1$ to $t_0$.

Third case: V="0," D=arbitrary

If the input V has the signal "0" the output of the gate $Nd_{12}$ has the value "1." A change-over of the signal at the clock pulse input CP cannot produce a change-over of the gates, so that the output state of the trigger circuit is not changed.

It is known that the JK-flip-flop includes also the operations of the D-flip-flop and of the T-flip-flop. FIGS. 3*a* to 3*c* show that also the DV-flip-flop permits of carrying out the conventional operations. The operation as a D-flip-flop is very simple (FIG. 3*a*). The input V has the signal "1," whereas at the input D the I-operation is carried out. This suppresses the double control mentioned in the JK-flip-flop. In order ot carry out the T-operation (FIG. 3*h*), the output $\overline{Q}$ has to be connected to the input D. On first sight this seems to be unusual, but in practice it is not more difficult than the establishment of the connection required in the JK-flip-flop of the inputs J and K. The T-operation is carried out at the V input.

The *a*-synchronous operation (FIG. 3*c*) is derived, as is known, always from the operation of the T-flip-flop, in which the T input (here equal to the V input) receives the signal "1" and the first-mentioned clock pulse input CP forms the *a*-synchronous input AE.

FIG. 4*a* shows the simplest arrangement of a synchronous mod-16 counter comprising JK-flip-flops. Since the four trigger circuits K*a* . . . K*d*, which are connected through the gates $U_1$, $U_2$, carry out the T-operation, this arrangement may also be provided with DV-flip-flops FF*a* . . . FF*d* and a gate 2, which are connected as is shown in FIG. 3*b*. However, changing the code a still simpler mod-16 counter may be obtained by means of DV-flip-flops (FIG. 4*b*), which would be obtained only with great difficulty with JK-flip-flops.

FIG. 5*a* shows a shift register-counter of five trigger circuits K*a* . . . K*e*, in which the double connections between the outputs a, $\overline{a}$ . . . e, $\overline{e}$ and the inputs J and K are clearly shown. In contrast thereto the wiring of the shift register-counter (FIG. 5*b*) composed of DV-flip-flops FF*a* . . . FF*e* is distinctly simpler, since no complementary double excitation is required.

For shift registers having two senses of shifting there would, properly speaking, be required bistable trigger circuits having two clock pulse inputs. However, since such circuits are not yet existing in the integrated circuit techniques, the known JK-flip-flops with the triggers K*a* . . . K*e* (FIG. 6*a*) are hitherto used, whilst the desired sense of shift is indicated via the control-conductors "forwards" and "backwards" respectively and via the AND-gates $U_1$ . . . $U_{10}$, the OR-gates $O_1$ . . . $O_5$ and the inverters $K_1$ . . . $K_5$. If for the same problem DV-flip-flops with the trigger circuits FF*a* . . . FF*e* (FIG. 6) are used, the inconvenient double excitation is again dispensed with, whilst five inverters, a large part of the wiring and moreover, transit time are saved.

If it is desired to form synchronous multi-decade counters, for example a mod-1000 counter, DV-flip-flops may be employed with great advantage. In this case only three completely identical decades have to be constructed (FIG. 7), each decade comprising five trigger circuits connected as is shown in FIG. 5*b*, whilst all V-inputs are connected to each other. The connection between the separate decades is established only by an AND-gate $U_{11}$ and $U_{22}$ respectively, which decodes each time the position 9 of a decade and is, in addition, controlled by the AND-gate of the preceding decade. If JK-flip-flops are employed, a virtually synchronous solution of this problem is not possible. At best the clock pulse CP could be applied simultaneously in parallel to all AND-gates, so that all AND-gates require each an additional input. This method is possible only with given flank conditions. Apart therefrom, each decade would exhibit the disadvantage of the complementary double control referred to in FIG. 5*b*.

FIG. 8 also shows a mod-1000 counter, in which, however, in contrast to FIG. 7, instead of the series combination, a parallel combination with the AND-gates $U_{17}$, $U_{18}$ for the transmission from one decade to the other is employed. With multi-decade counters a mixing of the two principles may be most efficient.

All the counters described hereinafter have in common that they comprise four bistable elements, which are connected by a logical network. The counters including JK-flip-flops are shown in FIGS. 9*a*, 10*a*, 11*a*. By way of comparison FIGS. 9*b*, 10*b*, 11*b* show the corresponding variants including DV-flip-flops.

The counter shown in FIG. 9*a* of the 8–4–2–1 code requires three additional AND-gates $U_{16}$ . . . $U_{18}$, that is to say two gates having two inputs and one gate having three inputs. The same counter including DV-flip-flops requires only three AND-gates $U_{19}$ . . . $U_{21}$ and two inputs each, so that one gate input is saved.

In FIGS. 10*a* and 10*b* two embodiments of the known unsymmetrical 2–4–2–1 code are compared. The superiority of the DV-flip-flop is clearly shown by the economization of two gates, whilst one OR-gate OG is maintained.

In the 3-excess code counter (FIGS. 11*a* and 11*b*) the arrangement including DV-flip-flops is simplified by one gate $U_{22}$ having three inputs, whereas the OR-gates $O_7$, $O_8$ and the AND-gates $U_{23}$, $U_{24}$ are also provided. It is known that only by joining of the decimal digits to the tetrades in a different way and by an exchange of the outputs d and $\overline{d}$ the 3-excess code counter can be changed into the Aiken code counter. Also to this counter applies therefore the comparison made in FIGS. 11*a* and 11*b*.

DV-flip-flops FF*a* . . . FF*d* also permit of composing a mod-10 counter, which does not require any additional gates (FIG. 12). This counter has furthermore the advantage that the in total eight logical inputs D and V are controlled by different outputs *a*, $\overline{a}$ . . . *d*, $\overline{d}$, so that a uniform distribution of the electrical charge is obtained.

In all circuit arrangements described above variants may be made by exchanging on known laws AND-, OR-, NAND-, NOR-gates.

What is claimed is:

1. A bistable trigger circuit having a pair of complementary outputs, first and second signal inputs and a clock pulse input, said trigger comprising a plurality of gates, a first group of said gates responsive to the presence of a binary "1" on said first of said signal inputs for establishing a first logical connection therebetween, said first group of gates responsive to the presence of a binary "0" on said first signal input for establishing a second logical condition, a second group of said gates responsive to the presence of a binary "0" or "1" on said second of said signal inputs for establishing a third logical connection of said signal inputs for establishing a third logical connection in said trigger, and a third group of said gates responsive to the presence of a clock pulse on said clock pulse input and to said first and third logical connections for providing said pair of complementary outputs indicative of the signal present on said second signal input, said third group of said gates further responsive to the presence of said clock pulse on said clock pulse input and to said second logical connections for maintaining an unchanging output regardles of the signal level of said second signal input.

2. A bistable trigger circuit as claimed in claim 1 wherein said plurality of gates comprises two input gates, two cross-wise coupled intermediate storing gates and two symmetrically arranged coupling gates having their inputs respectively connected to the outputs of said intermediate storing gates, and two further cross-wise coupled main storing gates, one of said input gates responsive to said second of said signal inputs, means connecting the output of said input gate to the other of said input gates, said two input gates responsive to said first of said signal inputs and said clock pulse input, the outputs of the two input gates being connected to an associated gate of the intermediate store and [on the other hand] to the two coupling gates, said coupling gates responsive to the outputs of the intermediate stores gates and means connecting the outputs [whose outputs again lead] of said coupling gates to the inputs of the main store.

3. A bistable trigger circuit as claimed in claim 1 wherein said plurality of gates includes a pair of cross-wise coupled main store gates, and an intermediate store having a first input gate responsive to said clocking input and said first signal input and having its output connected to the input of two intermediate gates, the outputs of which are coupled to the inputs of the cross-wise coupled main storing gates and fed back respectively to two initial gates, one input of one of said initial gates receiving the second of said signal inputs, the output of said one of said initial gates being connected to the input of the other of said initial gates, the intermediate gate associated with said other of said inital gates being connected to an input of the one of said main store gates forming the trigger output, the output of said one of said initial gates being connected to the input of the other said intermediate gates, the output of said last named the outputs of which are coupled to the inputs of the cross-wise coupled main storeing gates and fed back respectively two two initial gates, one input of one of said initial gates receiving the second of said signal inputs, the output of said one of said initial gates being connected to the input of the other of said initial gates, the intermediate gate associated with said other of said initial gates being connected to an input of the one of said main store gates forming the trigger output, the output of said one of said initial gates being connected to the input of the other said intermediate gates, the output of said last named gate being connected to the input of the other of said main store gates forming the complementary trigger output.

4. A bistable trigger circuit as claimed in claim 1 wherein a plurality of said trigger circuits are connected sequentially in the form of a shift register, one output of each triggering circuit being connected to the second signal input of the next trigger circuit, and one output of the last trigger circuit being connected to the second signal input of the first trigger circuit.

5. A bistable trigger circuit as claimed in claim 1 wherein a plurality of trigger circuits are connected sequentially and at least one output of each trigger circuit in a sequence is connected through both and AND- and OR-gate to the second signal input of the preceding trigger circuit and of the next-following trigger circuit.

6. A bistable trigger circuit as claimed in claim 1 wherein a plurality of trigger circuits are connected with an output of the preceding circuit to the second signal input of the next following circuit in order of succession and one output of each group of final trigger circuits is connected through an AND-gate associated therewith to the first signal input of the trigger circuit of a further group, the other output of each group of final trigger circuits being fed back to the second signal input of the initial trigger circuit of said group of final trigger circuits and the other output of the penultimate trigger circuit of said group of final trigger circuits and the other output of the penultimate trigger circuit of each group is connected to the AND-gate associated therewith.

7. A bistable trigger circuit as claimed in claim 1 wherein it is connected groupwise with an output of the preceding circuit connected to the second signal input of the next-following circuit in order of succession, one output of each group of final trigger circuits is connected, through an AND-gate provided for each group, to the first signal inputs of the trigger circuits of all further groups, whereas the other output of each group of final trigger circuits is fed back to the second signal input of the initial trigger circuit of said group and the other complementary output of the penultimate trigger circuit of each group is connected to one input each of the AND-gate associated with the further groups.

8. A circuit arrangement comprising bistable trigger circuits as claimed in claim 1 for use in a synchronous mod-10 counter in the 8–4–2–1 code, wherein there are provided four trigger circuits, in which an output of the first trigger is connected to the first signal input of the last trigger and via first and second AND-gates respectively to the first signal inputs of the second and third triggers, one output of the second trigger being connected to the second AND-gate to the second input of the last trigger, means connecting the other complementary outputs of the first three triggers to their own second signal inputs, the other complementary output of the last trigger being connected to said first AND-gate of the input of the second trigger.

9. A circuit arrangement comprising bistable trigger circuits as claimed in claim 1 for use in a synchronous mod-10 counter in an unsymmetric 2–4–2–1 code, wherein there are provided four trigger circuits one output of the first trigger being connected to the first signal input of the second trigger and via an AND-gate to the first signal inputs of the third and fourth triggers, said AND-gate receiving in addition, one output of the second trigger, the complementary other output of the first trigger being fed back to the second signal input of the first trigger and the other complementary output of the second trigger being connected through an OR-gate, to the second signal input of the second trigger, said OR-gate also receiving the output of a further AND-gate said further AND-gate output also coupled to the second signal input of the fourth trigger and receives inputs from one output of the third trigger and the complementary output of the last trigger, which last named output is, in addition, connected to the second signal input of the third trigger.

10. A circuit arrangement comprising bistable trigger circuits as claimed in claim 1 for use in a synchronous mod-10 counter in the 3-excess code, wherein there are provided four trigger circuits, one output of the first trigger being connected through a first OR-gate to the first signal input of the second trigger, and to a first AND-gate having its output connected to the second signal input of the last trigger, said first AND-gate having a further input connected to one output of the second trigger, a second OR-gate connected to the first signal input of the third trigger said second OR-gate having an input connected to the second signal input of the fourth trigger and to the output of a second AND-gate, said second AND-gate input including the uncomplemented outputs of the third and fourth triggers, the latter gate being, in addition connected to an input of the first OR-gate, the complementary outputs of the first three triggers being fed back to the respective second signal inputs of the said first three triggers.

11. A circuit arrangement comprising bistable trigger circuits as claimed in claim 1 for use in a synchronous mod-10 counter wherein there are provided four trigger circuits one output of the first trigger being connected to the second signal input of the second trigger, one output of the second trigger being connected to the second signal input of the third trigger, the one output of the third trigger being connected to the first signal input of the last trigger, the complementary other output of the last-mentioned trigger being connected to its second signal input, whereas the complementary output of the first trigger is connected to the first signal input of the last trigger, the complementary other output of the last-mentioned trigger being connected to its second signal input, whereas the complementary output of the first trigger is connected to the first signal input of the third trigger, the complementary output of the second trigger is connected to the second signal input of the first trigger and the complementary output of the third trigger to the first signal input of the first trigger.

12. A bistable trigger circuit as claimed in claim 1 wherein said plurality of gates comprises first and second input gates, receiving said first and second input signals respectively, an intermediate gate, a pair of clock pulse input gates each receiving said clock pulse input, a pair of cross-coupled main storing gates, the outputs of which form said output pair, a respective input of each of said main storing gates each respectively coupled to an output of one of said clocking pulse gates, means feeding back an output of one said clocking pulse gate to the second of said input gates; means connecting the output of said second of said input gates to the input of the last named clock pulse gate and to an input of said intermediate gate, means connecting the output of said intermediate gate to the input of the other of said clock pulse gates, the output of said latter gate being fed back to the input of said intermediate gate, and to the input of the said one of said clock pulse gates, means connecting the uncomplemented output of one of said main storing gates to an input of said first input gate, and means connecting the output of said first input gate to an input of said intermediate gate and to the input of one of said clock pulse gates.

References Cited

UNITED STATES PATENTS

| | | | |
|---|---|---|---|
| 3,219,845 | 11/1965 | Nieh | 307—289 X |
| 3,284,645 | 11/1966 | Eichelberger et al. | 307—289 X |
| 3,334,189 | 8/1967 | Soos | 307—218 |
| 3,371,221 | 2/1968 | Onuma et al. | 307—221 |

JOHN S. HEYMAN, Primary Examiner

U.S. Cl. X.R.

307—208, 218, 247, 292

UNITED STATES PATENT OFFICE
CERTIFICATE OF CORRECTION

Patent No. 3,458,825 July 29, 1969

Klaus Lagemann

It is certified that error appears in the above identified patent and that said Letters Patent are hereby corrected as shown below:

Column 2, line 25, "note" should read -- not --. Column 5, line 36, before "changing" insert -- by --. Column 7, line 25, cancel "the outputs of which"; line 26, beginning with "are coupled" cancel all to and including "last named" in line 36; lines 63 and 64, cancel "of final trigger circuits and the other output of the penultimate trigger circuit of each group" and insert -- each group is con- --.

Signed and sealed this 31st day of March 1970.

(SEAL)
Attest:

EDWARD M.FLETCHER,JR.
Attesting Officer

WILLIAM E. SCHUYLER, JR.
Commissioner of Patents